(12) United States Patent  (10) Patent No.: US 8,136,715 B2
Nunnery                    (45) Date of Patent:     Mar. 20, 2012

(54) INTERNAL PIPE CLAMP ALIGNMENT GUIDES WITH PURGE BACKUP

(75) Inventor: Dennis D Nunnery, Camden, TN (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 12/879,481

(22) Filed: Sep. 10, 2010

(65) Prior Publication Data

US 2010/0327045 A1    Dec. 30, 2010

Related U.S. Application Data

(62) Division of application No. 12/535,117, filed on Aug. 4, 2009, now Pat. No. 7,810,696.

(60) Provisional application No. 61/092,179, filed on Aug. 27, 2008.

(51) Int. Cl.
*B23K 31/02* (2006.01)
*B23K 37/04* (2006.01)

(52) U.S. Cl. ....... 228/212; 228/44.5; 228/49.3; 228/219

(58) Field of Classification Search ................ None
See application file for complete search history.

(56) References Cited

U.S. PATENT DOCUMENTS

| | | | |
|---|---|---|---|
| 2,615,413 A | 10/1952 | Adams et al. | |
| 3,197,195 A | 7/1965 | Work et al. | |
| 3,445,104 A | 5/1969 | Douglas | |
| 3,742,186 A | 6/1973 | Finkel et al. | |
| 3,920,171 A | 11/1975 | Clavin | |
| 4,682,724 A | 7/1987 | Hahn | |
| 5,285,947 A * | 2/1994 | Depperman | 228/49.3 |
| 5,288,005 A * | 2/1994 | Beakley et al. | 228/49.3 |
| 5,356,067 A | 10/1994 | Leduc | |
| 5,435,479 A | 7/1995 | Puzey et al. | |
| 5,535,938 A * | 7/1996 | Leduc | 228/212 |
| 5,538,173 A | 7/1996 | Hummel | |
| 5,568,893 A | 10/1996 | Depperman | |
| 5,583,305 A * | 12/1996 | Hirsch et al. | 73/865.8 |
| 5,609,291 A | 3/1997 | Hummel | |
| 5,816,475 A * | 10/1998 | Brookhouse | 228/49.3 |
| 6,109,503 A * | 8/2000 | Parker | 228/44.5 |
| 6,119,916 A * | 9/2000 | Anderson et al. | 228/44.5 |
| 6,398,100 B1 | 6/2002 | Radbourne et al. | |
| 6,662,994 B2 | 12/2003 | Jankus | |
| 2004/0031840 A1* | 2/2004 | Baylot | 228/44.5 |
| 2004/0099713 A1* | 5/2004 | Laing | 228/212 |

FOREIGN PATENT DOCUMENTS

EP   0193812   10/1986

(Continued)

*Primary Examiner* — Kiley Stoner

(57) ABSTRACT

This invention relates to an apparatus for clamping adjacent ends of pipe sections to be welded, the apparatus comprising a plurality of clamping members movable between retracted and extended clamping positions, each of the clamping members comprising a clamping shoe and a connecting member connecting the shoe to the apparatus frame; each of the clamping shoes comprising a longitudinal groove on its clamping surface oriented parallel to the adjacent pipe ends, at least one gas passageway through the clamping shoe which extends from a surface of the shoe away from the clamping surface to a termination point within the longitudinal groove, and at least one alignment guide device in the longitudinal groove; a means for delivering an inert purge gas to the longitudinal groove through the gas passageway; and a means for moving the clamping members between the retracted and extended clamping positions.

5 Claims, 3 Drawing Sheets

FOREIGN PATENT DOCUMENTS

| | | |
|---|---|---|
| GB | 2156468 | 10/1985 |
| JP | 404089198 | 3/1992 |
| JP | 7314187 | 12/1995 |
| JP | 8090228 | 4/1996 |
| JP | 2007185663 | 7/2007 |

* cited by examiner

INTERNAL PIPE CLAMP ALIGNMENT GUIDES WITH PURGE BACKUP

This application is a divisional of Ser. No. 12/535,117, filed on Aug. 4, 2009, now U.S. Pat. No. 7,810,696, which claims benefit of 61/092,179, filed on Aug. 27, 2008.

FIELD OF THE INVENTION

This invention relates to the welding of pipe, and in particular to the alignment and clamping of abutting ends of pipes to be welded with an inert gas environment at the weld.

BACKGROUND OF THE INVENTION

In the construction of pipeline, it is common to position one end of a pipe section at the end of the pipeline under construction and weld the abutting ends together so that the pipe section becomes part of the pipeline. By moving the welding equipment along the pipeline as it is constructed, any desired length of pipeline can be created. However, one of the difficult problems in this type of operation is to ensure that the abutting ends of the pipe section and pipeline are properly positioned for welding. The center line of both the pipeline and pipe section at the weld should coincide. In addition, the ends of the pipeline and pipe section should be precisely aligned and have the proper gap between the adjacent pipes maintained to perform the weld.

In the past, both internal and external clamps have been used to align and clamp pipe for welding. Internal clamps are sometimes preferred due to the fact that they allow for uninhibited access to the exterior of the pipe joint for welding. U.S. Pat. No. 3,445,104, issued to E. H. Douglas on May 20, 1969, illustrates one example of an internal pipe clamp. In this device, two rings of clamp shoes are mounted on the clamp. The rings are spaced apart a predetermined distance along the length of the clamp. Each ring of shoes can be moved radially outward to clamp against the inner surface of a pipe section. The clamp is positioned within the pipe sections to be welded at the abutting ends of the pipe sections and each ring of shoes will be urged against the inner surface of a pipe section, drawing the abutting ends of the pipe into alignment for welding.

In some other internal pipe clamps, a back-up plate is employed to facilitate welding of the joint. For instance, U.S. Pat. No. 3,197,195, issued to J. S. and E. H. Work on Jul. 27, 1965, illustrates an internal pipe clamp which employs a back-up plate coupled to flanges adjacent to each side of the back-up plate, thereby allowing the pipe to be internally clamped by the single flange/back-up plate apparatus at the site of the pipe joint.

Another internal pipe clamp design is described in U.S. Pat. No. 3,920,171 to Edward A. Clavin, issued Nov. 18, 1975. In this clamping apparatus, the clamping mechanism has attached to it a means for properly spacing the ends of the pipes to be welded. This apparatus does not contain back-up plate nor does it clamp along substantially the entire internal pipe circumference, but rather it employs finger-like projections that contact the pipe at a number of locations.

In addition, when welding pipe of certain alloys, including for example stainless steel, the weld must be made in an oxygen free environment. Stainless steel and certain other alloys, oxidize when heated to the temperatures used in welding. If such oxidization occurs, the pipe will fail in service much more rapidly because of the corrosion that was created by the failure to weld the pipes in an oxygen free environment. In order to provide for the welding of pipe in a pipeline in an oxygen free environment, a technique has been developed to purge the oxygen from the weld site. One way this can be accomplished is by employing inflatable bladders within each of the pipe sections to be welded to define an enclosed volume within the pipe sections which can be purged with an inert gas, such as argon, thereby replacing the oxygen rich atmosphere and permitting the weld to be made by welding equipment outside the pipe. When employing such a purge system, the pipe sections are frequently aligned and clamped by an external clamping mechanism.

European Patent Application Publication No. 0193812 A2, published on Sep. 10, 1986, discloses an internal pipe clamp device which also contains a purge system. This apparatus contains two clamping rings for clamping the pipes near the pipe joint, as well as two sealing rings adjacent to the clamping rings and away from the pipe joint. Thus, these sealing rings define an enclosed area containing the clamping rings and the pipe joint. This apparatus does not include a back-up plate.

U.S. Pat. No. 5,609,291 to Jon C. Hummel, issued on Mar. 11, 1997, describes an internal pipe clamp which contains a groove that is to be oriented at the pipe junction. This groove contains holes through which purge gas is delivered to the weld area. This invention employs a double-wedge-type expansion system as opposed to a hydraulic piston-type expansion system. In addition, this invention does not provide a means for ensuring proper placement of the pipe junction or proper pipe junction spacing. Japanese Patent Application No. JP19940246841, published as Publication No. JP8090228, again describes an internal pipe clamp which contains a groove on the clamping shoes, the groove containing holes through which a purge gas is delivered to the weld area. However, this invention also fails to provide a means for ensuring proper placement of the pipe junction or proper pipe junction spacing.

Thus, a need still exists for a pipe clamping apparatus which is able to clamp and align two adjacent sections of pipe internally while providing a back-up plate for the weld, an inert gas purge at the weld site, and a means for ensuring the pipe junction is properly placed along the clamping apparatus and possesses the proper pipe spacing.

SUMMARY OF THE INVENTION

This invention relates to an apparatus for clamping adjacent ends of a first pipe section and a second pipe section, said apparatus comprising: a frame; a plurality of clamping members for engaging said adjacent ends of said first pipe section and said second pipe section extensibly mounted to said frame, said clamping members being movable between a retracted position and an extended clamping position; wherein each of said plurality of clamping members comprises a clamping shoe and a connecting member that connects said clamping shoe to said frame; wherein each of said clamping shoes comprises a clamping surface which contacts the internal surface of said first pipe section and said second pipe section when said clamping members are in the extended clamping position; wherein each of said clamping shoes comprises a longitudinal groove on said clamping surface, said longitudinal groove being oriented parallel to said adjacent ends of said first pipe section and said second pipe section thereby dividing said clamping shoe into a first pipe contact surface and a second pipe contact surface; wherein each of said clamping shoes further comprises at least one gas passageway through said clamping shoe, said gas passageway extending from a point on a surface of said clamping shoe away from said clamping surface to a termination point within said longitudinal groove on said clamping surface; and wherein each of said clamping shoes further comprises one or more alignment guide devices protruding from one or more of said clamping surfaces along said longitudinal grooves; a means for delivering a purge gas to said groove through said gas passageway; and a means for moving said clamping members between said retracted position and said extended clamping position. Preferably, the means for moving said set of pipe clamps between said retracted position and said extended clamping position comprises hydraulic force. More preferably, each of said connecting members comprises a hydraulic actuator assembly comprising a hydraulic piston. Also, preferably, one or more of said longitudinal grooves further comprises one or more transverse depressions, and said one or more alignment guide devices are removably inserted into said one or more transverse depressions.

In another embodiment, the apparatus is capable of clamping a variety of pipe sizes, wherein said clamping shoes are detachable from said connecting members and replaceable with clamping shoes of a different size.

In yet another embodiment, the apparatus is capable of clamping a first pipe section and a second pipe section of different sizes, wherein one of said first pipe contact surface and second pipe contact surface protrudes radially beyond the other of said first pipe contact surface and second pipe contact surface.

This invention also relates to a method of welding together a first pipe section and a second pipe section, the method comprising a) providing an internal pipe clamp apparatus comprising one or more clamping members, said clamping members comprising one or more alignment guide devices, and said clamping members further comprising a means for supplying an inert purge gas directly to the area immediately surrounding a weld joint; b) inserting into said first pipe section and said second pipe section said internal pipe clamp apparatus; c) aligning the ends of said first pipe section and said second pipe section and creating a desired weld-joint gap between said ends of said first pipe section and said second pipe section using said alignment guide devices attached to said clamping members of said internal pipe clamp apparatus; d) clamping in this position said first pipe section and said second pipe section using said clamping members of said internal pipe clamp apparatus; e) supplying an inert purge gas directly to the area immediately surrounding a weld joint using said purge gas supply means of said clamping members of said internal pipe clamp apparatus; and f) welding to one another said first pipe section and said second pipe section. In addition, the first pipe section can possess a larger or smaller internal diameter than the second pipe section.

DETAILED DESCRIPTION OF THE INVENTION

This invention relates to the welding of pipe, and in particular to the alignment and clamping of abutting ends of pipes to be welded with an inert gas environment at the weld. More specifically, this invention relates to internally clamping pipe sections to be welded using an apparatus which possesses alignment guide devices that can be used ensure the pipe sections are properly aligned and that proper weld-joint gap is maintained during the welding operation. In addition, the present invention relates to the delivery of an inert purge gas directly to the area immediately surrounding the weld via this same clamping apparatus. One embodiment of the apparatus of the present invention is illustrated in FIGS. 1-5 and herein described in detail.

Figure 1:
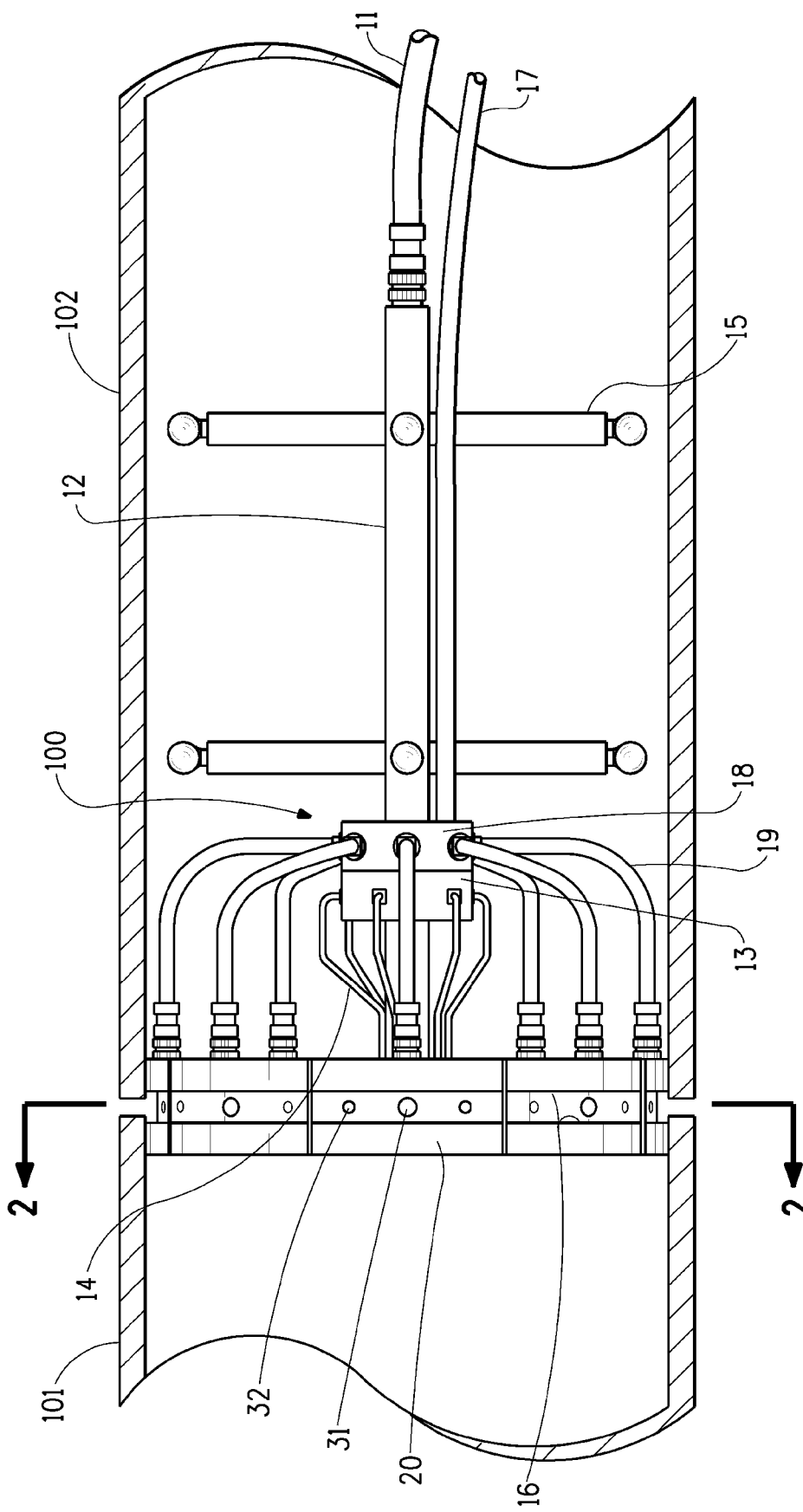
FIG. 1 is a sectional view of adjacent pipes with the clamping apparatus embodying the features of the present invention within said pipes.
Figure 2:
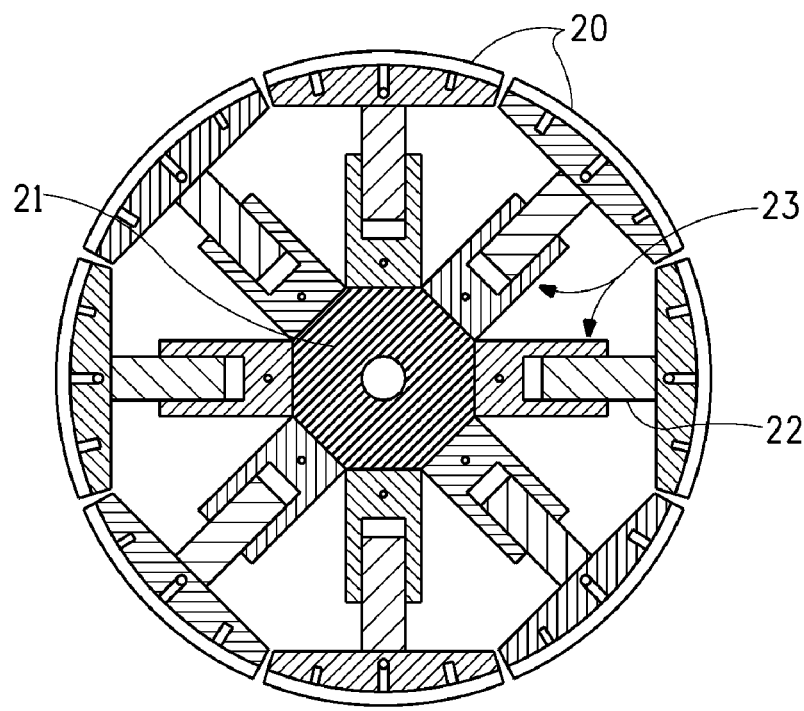
FIG. 2 is a sectional view of the clamping apparatus illustrated in FIG. 1 taken along line 2-2.

Referring to FIGS. 1 and 2 there is shown a clamping apparatus indicated generally by reference numeral 100 inside of pipe sections 101 and 102 to be clamped and aligned for welding. The clamping apparatus 100 includes a plurality of clamping shoes 20. While the apparatus of FIG. 1 possesses eight such clamping shoes, it should be noted that different numbers of shoes could also be employed, such as 2, 3, 4, 5, 6, 7, 9, 10, 11, or 12. Clamping shoes 20 are connected to the clamping apparatus frame 21 via hydraulic pistons 22, which make up a portion of hydraulic actuator assembly 23. Hydraulic fluid is supplied via main hydraulic supply line 11, which passes through support frame 12 and is distributed via hydraulic manifold 13 to hydraulic delivery tubes 14. Hydraulic delivery tubes 14 connect and allow supply of hydraulic fluid from hydraulic manifold 13 to hydraulic actuator assemblies 23. This in turn extends (and retracts) hydraulic pistons 22, thereby extending and retracting clamping shoes 20. When extended, the outermost surfaces of clamping shoes 20 grippingly contact pipe sections 101 and 102. It should also be noted that support members 15 are attached to support frame 12, which prevent support frame 12 from resting within pipe section 102 prior to extension of the clamping members.

Figure 3:
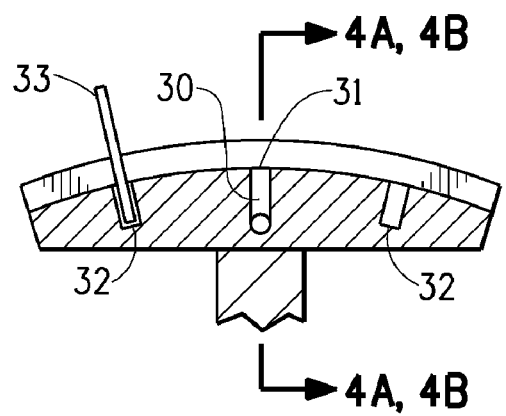
FIG. 3 is a sectional view of a clamping shoe of the clamping apparatus shown in FIGS. 1 and 2.
Figure 5A:
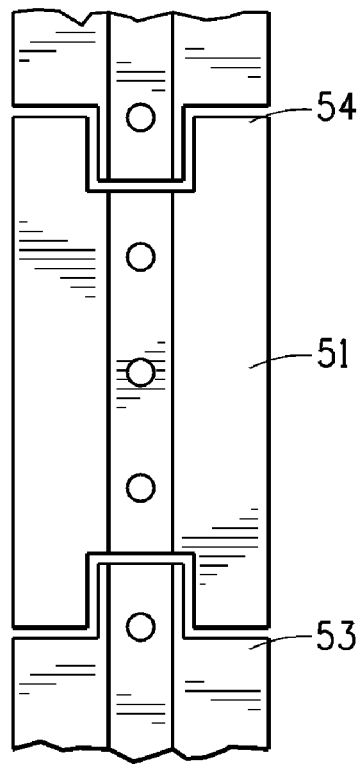
FIGS. 5A and 5B are alternative embodiments of the clamping shoes shown in FIG. 1.
Figure 5B:
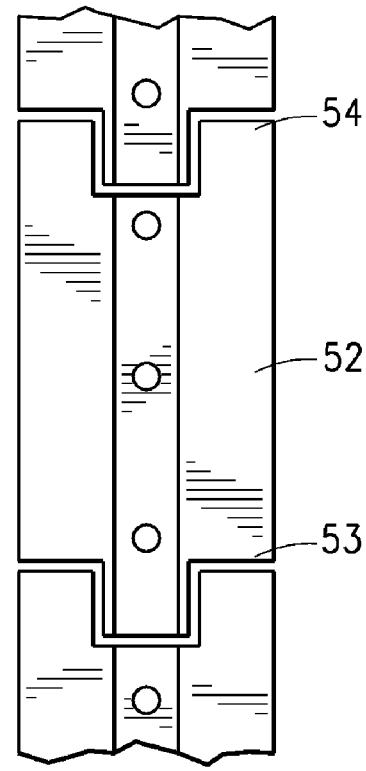

Clamping shoes 20 illustrated in FIGS. 1, 2, and 3 are shaped such that, when in an extended position, slight gaps will exist between the ends of adjacent shoes due to their becoming further from one another during radial extension. However, alternative embodiments of clamping shoes are illustrated in FIGS. 5A and 5B. Clamping shoes 51 and 52 of FIGS. 5A and 5B, respectively, are shaped at the ends in a tongue-and-groove fashion. As such, these clamping shoes having protruding end portions 53 and end recesses 54 which are designed such that the protruding end portions 53 fit within end recesses 54. This allows the shoes to remain in an overlapped position when extended into the clamping position.

Figure 4A:
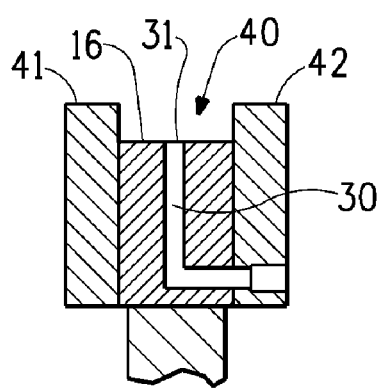
FIG. 4A is a sectional view of the clamping shoe shown in FIG. 3 taken along line 4A-4A of FIG. 3.
Figure 4B:
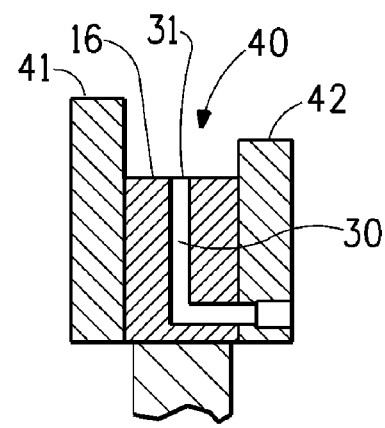
FIG. 4B is a sectional view of an alternative embodiment of the clamping shoe shown in FIG. 3 taken along line 4B-4B of FIG. 3.

Referring to FIGS. 1 and 4, clamping shoes 20 possess an outermost surface, clamping surface 40, which grippingly contacts the interior of pipe sections 101 and 102 when the shoes are in the extended clamping position. Clamping surface 40 of each of clamping shoes 21 possesses a longitudinal groove 16. This longitudinal groove 16 is oriented such that it runs parallel to the adjacent ends of pipe sections 101 and 102. Longitudinal groove 16 thus divides the clamping surface 40 into a first pipe contact surface 41 and a second pipe contact surface 42. When properly inserted into adjacent pipe sections, the device should be positioned such that one of the pipes to be welded is gripped by contact surface 41 with the end of that pipe along longitudinal groove 16, while the other pipe to be welded is gripped by contact surface 42 with the end of that pipe also lying along longitudinal groove 16. As illustrated in FIG. 4B, in one embodiment contact surface 41 protrudes radially beyond contact surface 42, thereby allowing pipes of differing internal diameters to be clamped and aligned using the present invention.

Referring to FIGS. 1, 3, and 4 a gas passageway 30 is formed into each of clamping shoes 20. This gas passageway extends from a point on clamping shoe 20 away from clamping surface 40 and terminates within longitudinal groove 16 at gas exit hole 31. Gas supply line 17 supplies an inert purge gas, via gas manifold 18, to gas delivery tubes 19. Gas delivery tubes 19 extend from gas manifold 18 to gas passageways 30. Thus, when this device is employed in the welding of adjacent pipe sections, inert purge gas travels through gas passageways 30, exiting through exit hole 31, and resulting in inert purge gas being supplied directly to the weld joint lying along longitudinal groove 16.

Additionally, alignment guide depressions 32 are formed into each of clamping shoes 21 within longitudinal groove 16. Each alignment guide depression 32 is capable of receiving an alignment guide device 33, which can be removably inserted therein. After being placed within pipe sections 101 and 102, one or more of alignment guide devices 33 can be inserted into alignment guide depressions 32 to ensure that adjacent pipe sections 101 and 102 are properly aligned and to ensure the proper gap for welding is maintained prior to and during extension of clamping shoes 20 into a gripping position with the pipes. Once clamping shoes 20 are in the extended clamping position and are gripping pipe sections 101 and 102, alignment guide devices 33 can be removed prior to or during the welding process, thereby allowing the pipe joint to be completely circumferentially welded.

What is claimed is:

1. A method of welding together a first pipe section and a second pipe section, said method comprising
   a) providing an internal pipe clamp apparatus comprising a frame; one or more clamping members, said one or more clamping members comprising one or more alignment guide devices, and said clamping members further comprising a means for supplying an inert purge gas directly to the area immediately surrounding a weld joint; a plurality of clamping members for engaging said adjacent ends of said first pipe section and second pipe section extensibly mounted to said frame, said plurality of clamping members being movable between a retracted position and an extended clamping position;
      1) wherein each of said plurality of clamping members comprises a clamping shoe and a connecting member that connects said clamping shoe to said frame;
      2) wherein each of said clamping shoes comprises a clamping surface which contacts the internal surface of said first pipe section and said second pipe section when said clamping members are in the extended clamping position;
      3) wherein each of said clamping shoes comprises a longitudinal groove on said clamping surface, said longitudinal groove being oriented parallel to said adjacent ends of said first pipe section and said second pipe section, thereby dividing said clamping shoe into a first pipe contact surface and a second pipe contact surface;
      4) wherein each of said clamping shoes further comprises at least one gas passageway through said clamping shoe, said gas passageway extending from a point on a surface of said clamping shoe away from said clamping surface to a termination point within said longitudinal groove on said clamping surface; and
      5) wherein each of said clamping shoes further comprises one or more alignment guide devices protruding from one or more of said clamping surfaces along said longitudinal grooves;
   a means for delivering a purge gas to said groove through said gas passageway; and
   a means for moving said clamping members between said retracted position and said extended clamping position;
      b) inserting into said first pipe section and said second pipe section said internal pipe clamp apparatus;
      c) aligning the ends of said first pipe section and said second pipe section and creating the desired weld-joint gap between said ends of said first pipe section and said second pipe section using said alignment guide devices attached to said one or more clamping members of said internal pipe clamp apparatus;
      d) clamping in this position said first pipe section and said second pipe section using said one or more clamping members of said internal pipe clamp apparatus;
      e) supplying an inert purge gas directly to the area immediately surrounding the weld joint using said purge gas supply means of said one or more clamping members of said internal pipe clamp apparatus; and
      f) welding to one another said first pipe section and said second pipe section.

2. The method of claim 1, wherein one or more of said longitudinal grooves further comprises one or more transverse depressions, and wherein said one or more alignment guide devices are removably inserted into one or more of said transverse depressions.

3. The method of claim 1, wherein said means for moving said set of pipe clamps between said retracted position and said extended clamping position comprises hydraulic force.

4. The method of claim 1, wherein each of said connecting members comprises a hydraulic actuator assembly comprising a hydraulic piston.

5. The method of claim 1, wherein said first pipe section possesses a larger or smaller internal diameter than said second pipe section, and which is capable of clamping a first pipe section and a second pipe section of different sizes, wherein one of said first pipe contact surface and second pipe contact surface protrudes radially beyond the other of said first pipe contact surface and second pipe contact surface.

* * * * *